| (12) United States Patent<br>Gu et al. | (10) Patent No.: US 10,241,830 B2<br>(45) Date of Patent: Mar. 26, 2019 |
|---|---|

(54) DATA PROCESSING METHOD AND A COMPUTER USING DISTRIBUTION SERVICE MODULE

(71) Applicant: HUAWEI TECHNOLOGIES CO., LTD., Shenzhen, Guangdong (CN)

(72) Inventors: Qiang Gu, Beijing (CN); Liufei Wen, Shenzhen (CN); Guangyu Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 216 days.

(21) Appl. No.: 14/936,118

(22) Filed: Nov. 9, 2015

(65) Prior Publication Data

US 2016/0077872 A1    Mar. 17, 2016

Related U.S. Application Data

(63) Continuation of application No. PCT/CN2013/087107, filed on Nov. 14, 2013.

(30) Foreign Application Priority Data

May 9, 2013  (CN) .......................... 2013 1 0169222

(51) Int. Cl.
  *G06F 9/46*  (2006.01)
  *G06F 9/48*  (2006.01)
  (Continued)

(52) U.S. Cl.
  CPC ............ *G06F 9/4881* (2013.01); *G06F 9/546* (2013.01); *H04L 69/12* (2013.01)

(58) Field of Classification Search
  None
  See application file for complete search history.

(56) References Cited

U.S. PATENT DOCUMENTS 6,246,683 B1 * 6/2001 Connery ................. H04L 49/90
                                                           370/392
6,675,218 B1   1/2004 Mahler et al.
(Continued)

FOREIGN PATENT DOCUMENTS

CN         101170511 A      4/2008
CN         101867558 A     10/2010
(Continued)

OTHER PUBLICATIONS

Koh, Y. et al., "Efficient Packet Processing in User-Level OSes: A Study of UML", Local Computer Networks, Proceedings 2006 31st IEEE Conference on IEEE, pp. 63-70, 2006, total 8 pages.
(Continued)

*Primary Examiner* — Wissam Rashid
(74) *Attorney, Agent, or Firm* — Fish & Richardson P.C.

(57) ABSTRACT

A data processing apparatus and a data processing method are provided. The apparatus includes M protocol stacks and at least one distribution service module, and the M protocol stacks separately run on different logic cores of a processor and are configured to independently perform protocol processing on a data packet to be processed. The distribution service module receives an input data packet from a network interface and sends the data packet to one of the M protocol stacks for protocol processing, and receives data packets processed by the M protocol stacks and sends the data packets outwards through the network interface. The present disclosure implements a function of parallel protocol processing by multiple processes in user space of an operating system in a multi-core environment by using a parallel processing feature of a multi-core system, thereby reducing resource consumption caused by data packet copying.

8 Claims, 8 Drawing Sheets

(51) Int. Cl.
*H04L 29/06* (2006.01)
*G06F 9/54* (2006.01)

(56) References Cited

U.S. PATENT DOCUMENTS

| | | | | |
|---|---|---|---|---|
| 6,981,140 | B1* | 12/2005 | Choo | G06F 21/606 |
| | | | | 713/164 |
| 2004/0156315 | A1* | 8/2004 | Walls | H04L 47/10 |
| | | | | 370/235 |
| 2006/0088009 | A1 | 4/2006 | Gibbs et al. | |
| 2006/0165090 | A1* | 7/2006 | Kalliola | H04L 29/06 |
| | | | | 370/395.21 |
| 2009/0296685 | A1 | 12/2009 | O'Shea et al. | |
| 2010/0070106 | A1* | 3/2010 | Okamoto | H04L 67/12 |
| | | | | 701/1 |
| 2012/0216216 | A1 | 8/2012 | Lopez Taboada | |

FOREIGN PATENT DOCUMENTS

| | | |
|---|---|---|
| CN | 102158414 A | 8/2011 |
| CN | 102339234 | 2/2012 |
| CN | 102662910 A | 9/2012 |
| EP | 1387279 B1 | 5/2008 |

OTHER PUBLICATIONS

Thekkath, C.A., et al., "Implementing Network Protocols at User Level", IEEE/ACM Transactions on Networking 1 (5):554-65, Oct. 1993, total 12 pages.

* cited by examiner

DATA PROCESSING METHOD AND A COMPUTER USING DISTRIBUTION SERVICE MODULE

CROSS-REFERENCE TO RELATED APPLICATIONS

This application is a continuation of International Application No. PCT/CN2013/087107, filed on Nov. 14, 2013, which claims priority to Chinese Patent Application No. 201310169222.1, filed on May 9, 2013, both of which are hereby incorporated by reference in their entireties.

TECHNICAL FIELD

The present disclosure relates to the computer field, and in particular, to a data processing apparatus and a data processing method.

BACKGROUND

A Linux operating system is divided into two parts. One part is core software, which is also referred to as kernel space, and the other part is a common application program, which is also referred to as user space. In the prior art, the Linux system has only one protocol stack instance, which runs in the kernel space. A single-instance protocol stack cannot implement parallel protocol processing on data, and has relatively low processing efficiency. Meanwhile, when a developer develops an application, the developer needs to develop the application in user mode. Therefore, when a user-mode application needs to access kernel-mode memory space, data in the memory space needs to be copied to the user space, and then the user-mode application can access the corresponding data. This results in relatively large resource consumption.

SUMMARY

A data processing method is provided, wherein the method is applied to user space of an operating system. The data processing method includes receiving a data packet from an input port on a network interface, storing the received data packet in memory space, wherein the memory space is memory space after memory mapping, and the memory space is accessible in both user mode and kernel mode, determining, according to an attribute of the data packet, a first protocol stack that needs to perform protocol processing on the data packet, wherein the first protocol stack is one of M protocol stacks, the M protocol stacks are disposed in the user space of the operating system, and each of the M protocol stacks separately runs on a logic core of a processor, M is a positive integer greater than 1, and inserting a pointer into an input queue corresponding to the first protocol stack, wherein the pointer points to an address of the data packet in the memory space, so that the first protocol stack retrieves the data packet from the memory space and performs protocol processing on the data packet according to a protocol processing rule.

A data processing method is provided. The data processing method includes storing, by a first protocol stack, a data packet after protocol processing in memory space, and inserting, according to an attribute of the data packet, a pointer to the data packet into an output queue, so that a distribution service module reads the pointer from the output queue, and sends the data packet corresponding to the pointer and is in the memory space through a network input/output module to an output port on a network interface corresponding to the output queue so as to send the data packet corresponding to the pointer outwards, wherein the first protocol stack is one of M protocol stacks located in user space, each of the M protocol stacks separately runs on a logic core of a processor, and the M protocol stacks and the distribution service module are disposed in the user space of an operating system, the output queue corresponds to the output port on the network interface, and the pointer of the data packet points to an address of the data packet in the memory space, wherein the memory space is memory space after memory mapping, the memory space is accessible in both user mode and kernel mode, and M is a positive integer greater than 1.

A data processing apparatus is provided. The data processing apparatus includes a memory configured to store executable program code, at least one network interface, and at least one processor operably coupled to the memory and the at least one network interface. The at least one processor is configured to read the executable program code stored in the memory to receive a data packet from an input port on the at least one network interface, store the received data packet in memory space of the memory, wherein the memory space is memory space after memory mapping and the memory space is accessible in both user mode and kernel mode, determine, according to an attribute of the data packet, a first protocol stack that needs to perform protocol processing on the data packet, wherein the first protocol stack is one of M protocol stacks, the M protocol stacks are disposed in the user space of an operating system, each of the M protocol stacks separately runs on a logic core of the at least one processor, and M is a positive integer greater than 1, and insert a pointer into an input queue corresponding to the first protocol stack, wherein the pointer points to an address of the data packet in the memory space so that the first protocol stack retrieves the data packet from the memory space, and performs protocol processing on the data packet according to a protocol processing rule.

A computer program product is provided. The computer program product includes a non-transitory computer readable medium having stored thereon executable program code, wherein the executable program code is used for enabling a data processing apparatus to perform a data processing method applied to user space of an operating system. The executable program code, when executed by a processor, instructs the processor to receive a data packet from an input port on the at least one network interface, store the received data packet in memory space, wherein the memory space is memory space after memory mapping and the memory space is accessible in both user mode and kernel mode, determine, according to an attribute of the data packet, a first protocol stack that needs to perform protocol processing on the data packet, wherein the first protocol stack is one of M protocol stacks, the M protocol stacks are disposed in the user space of an operating system, and each of the M protocol stacks separately runs on a logic core of the at least one processor, M is a positive integer greater than 1, and insert a pointer into an input queue corresponding to the first protocol stack, wherein the pointer points to an address of the data packet in the memory space, so that the first protocol stack retrieves the data packet from the memory space and performs protocol processing on the data packet according to a protocol processing rule.

A computer is provided. The computer includes a hardware layer and a layer of an operating system running above the hardware layer. The hardware layer comprises at least one network interface and at least one processor. The processor comprises at least M logic cores, M is a positive integer greater than 1, the operating system is divided into kernel space and user space, and M protocol stacks and a distribution service module are disposed in the user space. The M protocol stacks separately run on the M logic cores of the processor, and each of the M protocol stacks is used to independently perform, according to a protocol processing rule, protocol processing on a data packet to be processed. The distribution service module is configured to receive a data packet from at least one input port on the at least one network interface and store the data packet to memory space so that one protocol stack of the M protocol stacks performs protocol processing on the data packet, receive data packets processed by the M protocol stacks, and send the data packets outwards through an output port on the network interface, wherein the memory space is memory space after memory mapping and the memory space is accessible in both user mode and kernel mode.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. The technical solutions of the present disclosure are further detailed below with reference to the accompanying drawings and embodiments.

An objective of the present disclosure is to provide a data processing apparatus, so as to implement a function of parallel protocol processing by multiple processes in user space of an operating system in a multi-core environment by using a parallel processing feature of a multi-core system, and reduce, by using a memory mapping technology, resource consumption caused by data packet copying.

Figure 1:
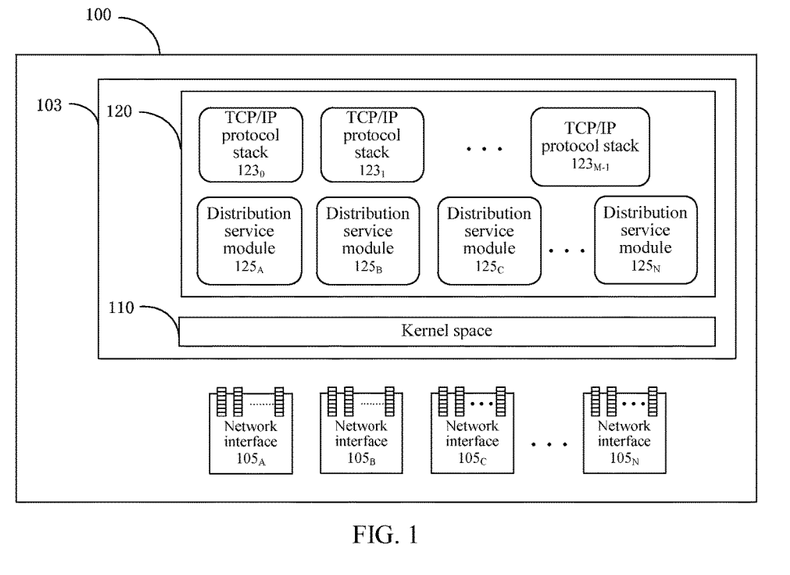
FIG. 1 is a diagram of a data processing apparatus according to an embodiment of the present disclosure.

FIG. 1 is a diagram of a data processing apparatus 100 according to an embodiment of the present disclosure. The data processing apparatus 100 includes an operating system 103 and one or more network interfaces 105, with the operating system 103 including a kernel space 110 and a user space 120, and the network interfaces 105 for interfacing with various networks or network access points. The user space 120 includes, among other things, one or more protocol stacks 123 and at least one distribution service module 125. In the figure, the protocol stacks 123 comprise M number of protocol stacks $123_0$-$123_{M-1}$, and where M is a positive integer greater than 1. A protocol stack 123 is used to process incoming and/or outgoing packets with protocol conversion, such as TCP/IP stack. A distribution service module 125 is used to distribute packets from network interfaces to protocol stacks, and/or distribute packets from protocol stacks to network interfaces.

The incoming packets from network interfaces 105 are passed to distribution service modules 125 in user space 120, and continue processing in protocol stacks 123. The outgoing packets are processed in protocol stacks 123 in user space 120 first, then passed to distribution service modules 125. The distribution service modules 125 in user space 120 then distribute the packets to network interfaces 105.

The protocol stacks 123 perform protocol processing on data packets to be processed. The protocol stacks 123 can perform protocol conversion on data packets. The protocol stacks 123 separately run on different logic cores (not shown) of a processor, and independently perform protocol processing. In addition, the protocol stacks 123 can operate according to protocol processing rules. The inclusion of multiple protocol stacks 123 may be needed in order to perform multiple different protocol conversions, such as where data packets are received from multiple sources.

The distribution service module 125 is configured to receive, according to a preconfigured rule, an input data packet from at least one input port on at least one network interface 105 and store the data packet to memory space, so that one protocol stack of the M protocol stacks 123 performs protocol processing on the data packet, and receive data packets processed by the M protocol stacks 123 and send the data packets outwards through an output port on the network interface 105, where the memory space is memory space after memory mapping and the memory space is accessible in both user mode and kernel mode.

There may be only one distribution service module, or M distribution service modules, which are in a one-to-one correspondence with the M protocol stacks and separately run on the different logic cores of the processor.

The different logic cores of the processor refer to multiple integral computing engines integrated in one processor, where each computing engine is referred to as a logic core.

The M user-mode protocol stacks 123 are executed separately on an independent logic core of a CPU, and run in parallel in a multi-core system. The M protocol stacks independently perform protocol processing in parallel without an intersection. The use of multiple protocol stacks 123 provides for more efficient and timely packet processing.

Figure 2:
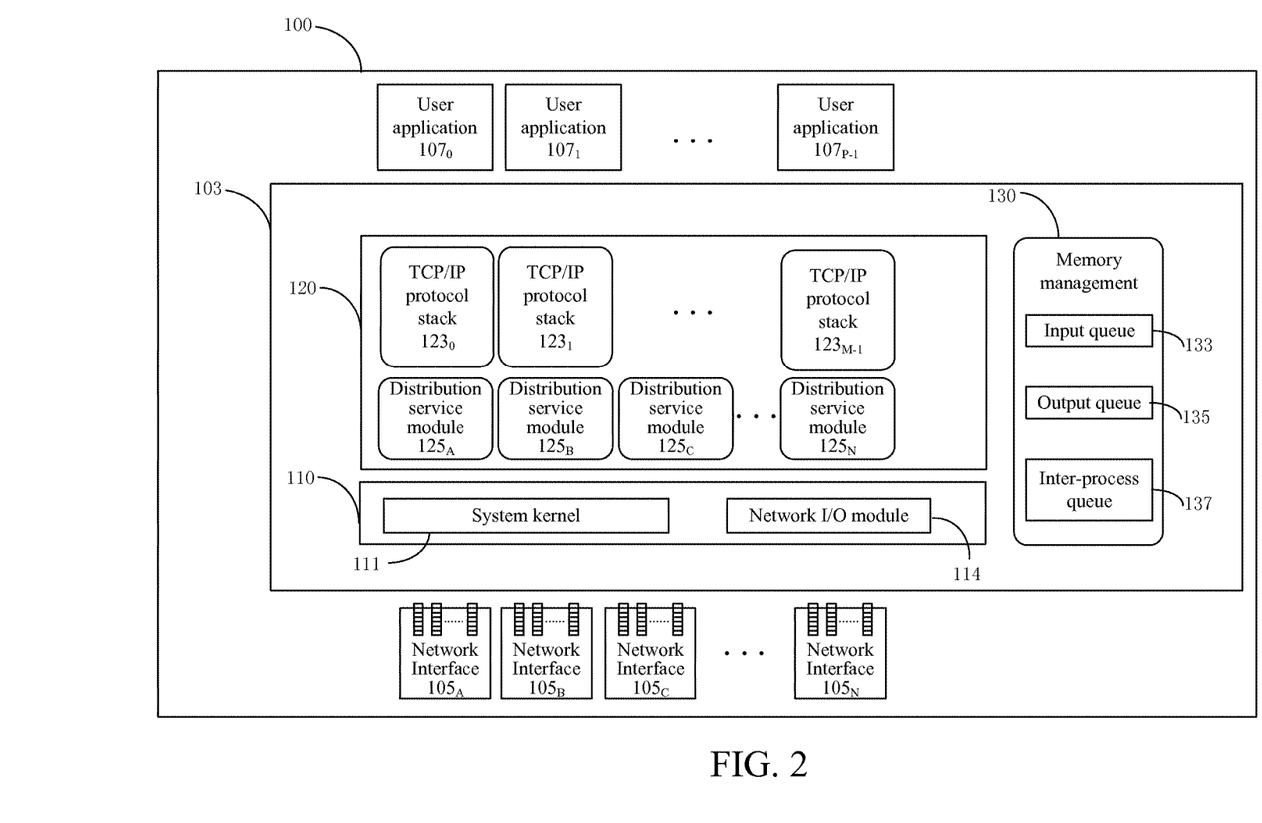
FIG. 2 is a diagram of a data processing apparatus according to another embodiment of the present disclosure.

FIG. 2 is a diagram of a data processing apparatus 100 according to another embodiment of the present disclosure. In this embodiment, the kernel space 110 of the data processing apparatus 100 further includes a system kernel 111 and a network input/output module 114. The network input/output module 114 is located in kernel space 110, where the distribution service module 125 receives the data packet by using the network input/output module 114 from the input port on the network interface 105 and sends the data packet outwards by using the network input/output module 114 from the output port on the network interface 105.

Figure 3:
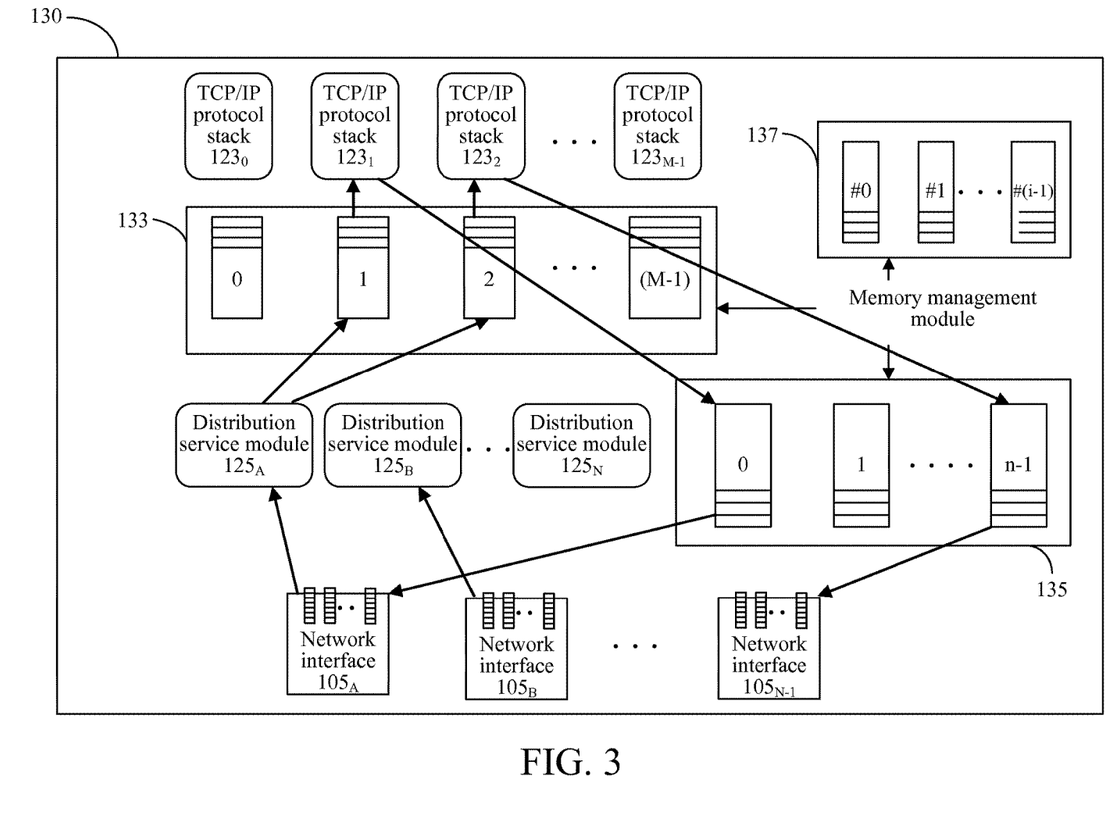
FIG. 3 is a diagram of a memory management module in a data processing apparatus according to an embodiment of the present disclosure.

The operating system 103 of the data processing apparatus 100 further includes a memory management module 130 which can be accessed by modules in both user space 120 and in kernel space 110. As shown in FIG. 2 and FIG. 3, the memory management module 130 includes memory space used to store a data packet comprising, M input queues 133. The M input queues 133 correspond to the M protocol stacks 123 and are used to store pointers to data packets that need to be processed by the M protocol stacks. The operating system 103 further includes n output queues 135 corresponding to the n output ports on the network interface 105 and are used to store pointers to data packets that need to be sent outwards, where the pointers point to addresses of the data packets in the memory space and n is a positive integer greater than 1.

The memory space is memory space after memory mapping, and is accessible in both the user mode and the kernel mode.

Optionally, the memory management module 130 may further include i inter-process communication queues 137 that are used to store a pointer of a data packet transmitted between processes, thereby avoiding system resource loss, where i is a positive integer greater than 0.

The data processing apparatus 100 further includes one or more user applications $107_1$-$107_{P-1}$. The user applications $107_1$-$107_{P-1}$ run on top of protocol stacks 123. The user applications 107 send outgoing packets to the protocol stacks 123, and receive incoming packets from the protocol stacks 123.

In operation, the network input/output module 114 stores a data packet received from the network interface 105 in the memory space. The distribution service module 125 reads a header of the data packet, determines, according to the header, the protocol stack 123 that needs to perform protocol processing on the data packet, and inserts a pointer to the data packet into an input queue 133 corresponding to the particular protocol stack 123. The protocol stack 123 reads, according to the pointer in the input queue 133 corresponding to the protocol stack 123, the data packet from the memory space and performs protocol processing on the data packet.

After performing protocol processing on the data packet, the protocol stack 123 determines, according to an attribute such as a destination address of the data packet, whether the data packet needs to be submitted to a user application 107. If the processed data packet needs to be submitted to the user application 107, the protocol stack 123 copies the data packet to the user application 107. If the processed data packet needs to be sent outwards, the protocol stack 123 inserts the pointer to the data packet into an output queue 135 in the memory management module 130. The distribution service module 125 sends the data packet corresponding to the pointer by using the network input/output module 114 from the output port on the network interface 105 corresponding to the output queue 135, where the pointer to the data packet points to an address of the data packet in the memory space.

Figure 4:
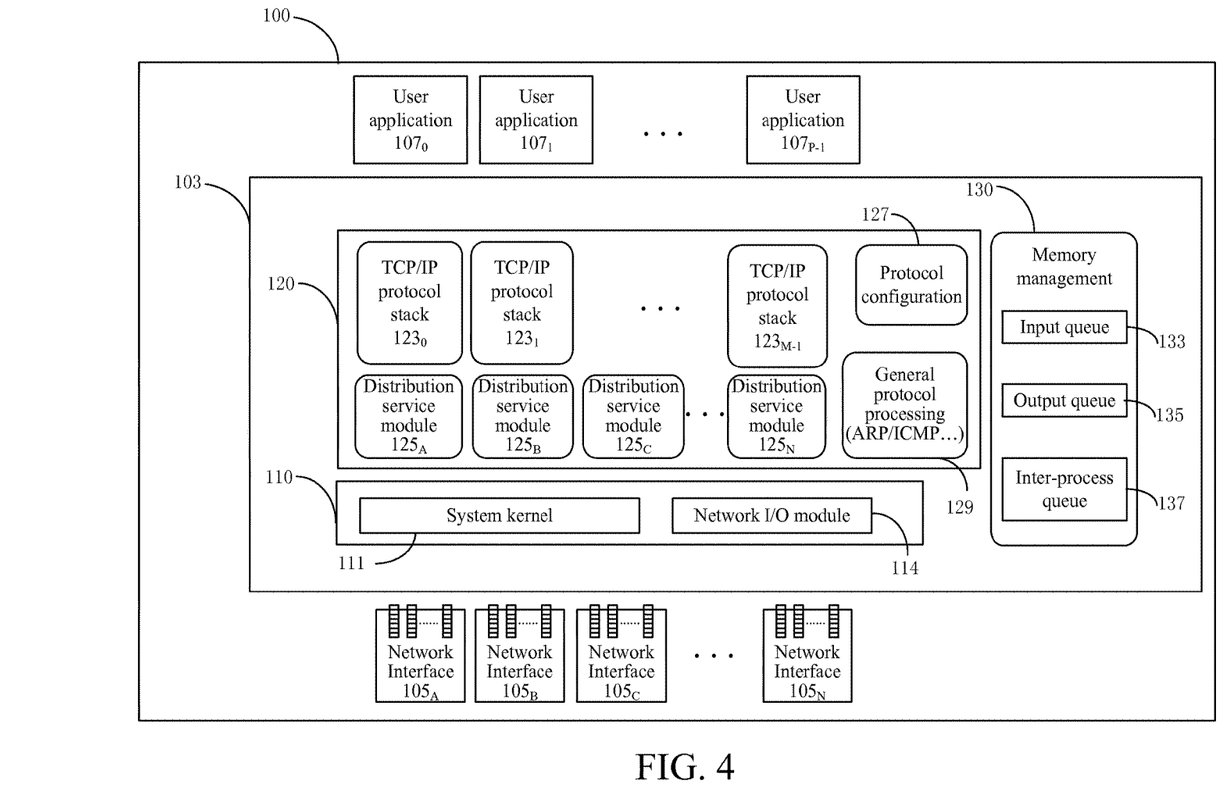
FIG. 4 is a diagram of a data processing apparatus according to still another embodiment of the present disclosure.

In this embodiment, the protocol processing rule that the M protocol stacks 123 comply with may use a system default configuration, or may be configured by using a protocol configuration module 127 additionally disposed in an embodiment shown in FIG. 4. The protocol configuration module 127 may perform system-related parameter configuration, including content such as protocol stack running parameter configuration, CPU logic core resource allocation, and data distribution policy configuration.

In a possible implementation manner, as shown in FIG. 4, a general protocol processing module 129 may further be disposed in the user space 120 and is configured to perform general protocol processing on a data packet. When the distribution service module 125 determines, according to the header of the received data packet, that general protocol processing needs to be performed on the data packet, the distribution service module 125 sends the pointer to the data packet to the general protocol processing module 129 for general protocol processing on the data packet corresponding to the pointer. For example, processing of protocols, such as the Address Resolution Protocol (ARP) or Internet Control Message Protocol (ICMP), whose processing is relatively simple, may be implemented by using the general protocol processing module 129.

The general protocol processing module 129 implements simple and general protocol processing processes. There may be one general protocol processing module in an entire system. According to system load, a specific protocol may be offloaded from the TCP/IP protocol stack 123 to the general protocol processing module 129, or a specific protocol processed by the general protocol processing module 129 may be offloaded to a TCP/IP protocol stack module 123 for processing. The general protocol processing module 129 is located in the user space 120 of the operating system 103.

According to the foregoing embodiments, M protocol stacks 123 independently perform, according to a preconfigured rule, protocol processing on data packets to be processed, where the M protocol stacks are disposed in user space 120 of an operating system 103 and separately run on different logic cores of a processor. The data packets to be processed are packets received by at least one distribution service module 125. This can improve protocol processing efficiency. The protocol stacks are applied in the user space 120, which may facilitate development of applications by developers. In addition, in the embodiments of the present disclosure, almost all data processing processes are performed in user mode, wherein data in kernel space 110 is transparently transmitted to user space 120 simply by memory mapping, thereby reducing resource consumption.

Figure 5:
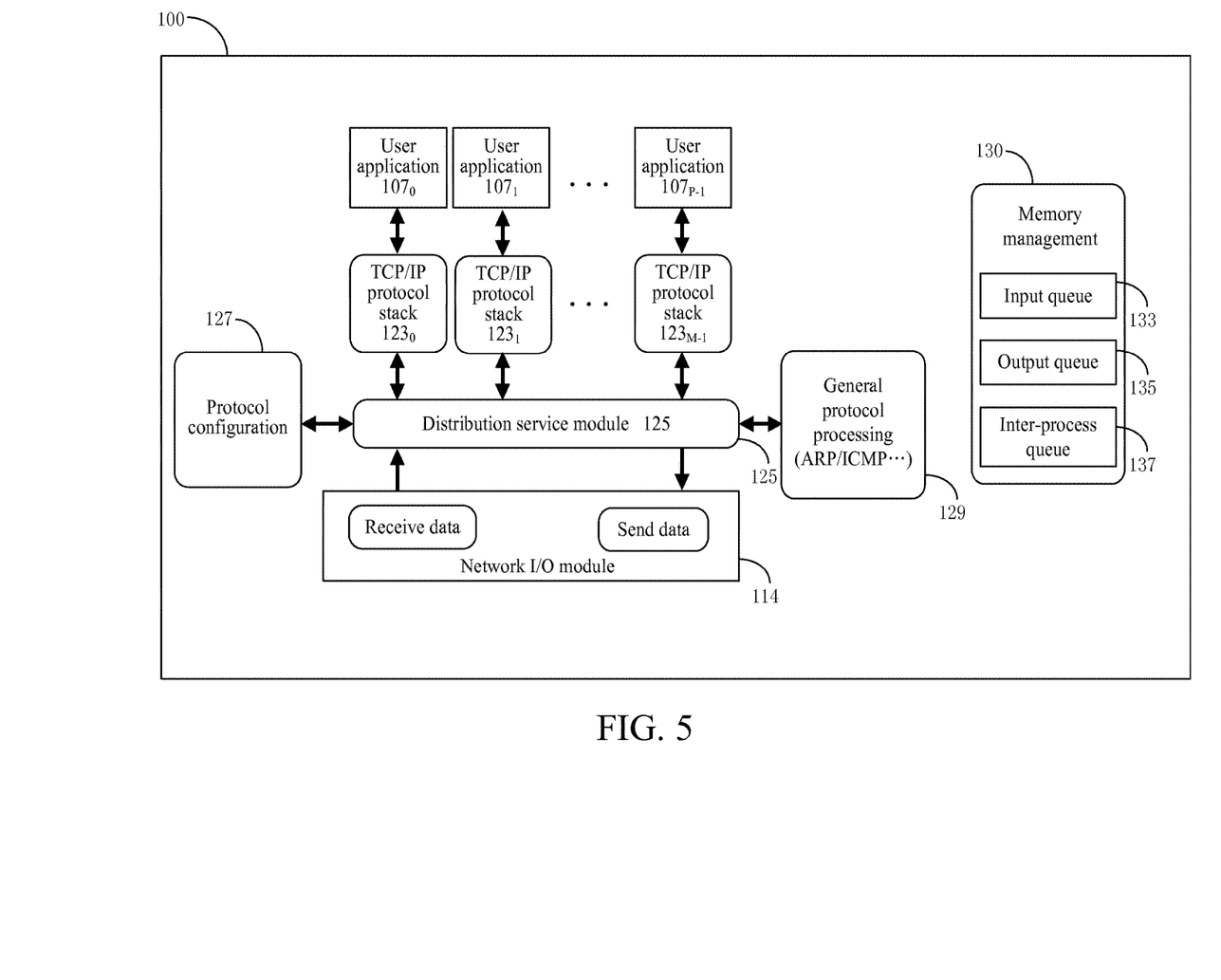
FIG. 5 is a diagram of a data processing apparatus according to still another embodiment of the present disclosure.

As shown in FIG. 5, in an embodiment of a data processing apparatus 100 according to an embodiment of the present disclosure, user space 120 only includes one distribution service module 125, where the distribution service module 125 may run on any logic core of a processor in a multi-core operating system.

The distribution service module 125 captures data packets in a polling mode from different input ports on multiple network interfaces 105, directly stores, in a memory mapping manner, the received data packets in memory space of a memory management module 130 by using a network input/output (I/O) module 114, and maps the memory space to the user space 120 in a memory mapping manner.

After the network input/output module 114 stores the received data packets to the memory space, the distribution service module 125 reads these data packets from the memory space, determines, according to attributes such as headers of the data packets, the protocol stacks 123 that need to process these data packets, and inserts, according to a distribution policy, pointers to the data packets to input queues 133 corresponding to the protocol stacks. Each user-mode protocol stack 123 is corresponding to one input queue 133, and pointers to data packets distributed to this protocol stack 123 are all inserted into the input queue 133. The protocol stack 123 reads, according to the pointers in the input queue 133, the data packets from the memory space and performs protocol processing.

After the protocol processing is performed, if the data packets after the protocol processing need to be processed by a user application 107, the protocol stack 123 copies the processed data packets to the corresponding user application 107. Otherwise, the protocol stack 123 discards the data packets or stores the data packets to the memory space according to a requirement.

If the data packets after the protocol processing need to be sent outwards, the protocol stack 123 inserts, according to attributes such as destination addresses of the data packets, the pointers to the data packets into output queues 135 in the memory management module 130, where there is a configured correspondence relationship between the output queues 135 and output ports on the network interfaces 105. After that, because there is a configured correspondence relationship between the distribution service module 125 and the output ports on the network interfaces, the distribution service module 125 retrieves the pointers corresponding to the output ports from the output queues 135, reads the data packets corresponding to the pointers, and sends, by using the network input/output module 114, the data packets corresponding to the pointers in the output queues to the output ports on the corresponding network interfaces 105.

According to the foregoing embodiment, M protocol stacks 123 independently perform, according to a configured protocol processing rule, protocol processing on data packets to be processed, where the M protocol stacks 123 are disposed in user space 120 of an operating system 103 and separately run on different logic cores of a processor. The data packets to be processed are packets received by a distribution service module 125. This can improve protocol processing efficiency. The protocol stacks are applied in the user space 120, which may facilitate development of applications by developers. In addition, in this embodiment of the present disclosure, almost all data processing processes are performed in user mode, data in kernel space 110 is transparently transmitted to user space 120 simply by memory mapping, thereby reducing resource consumption.

Figure 6:
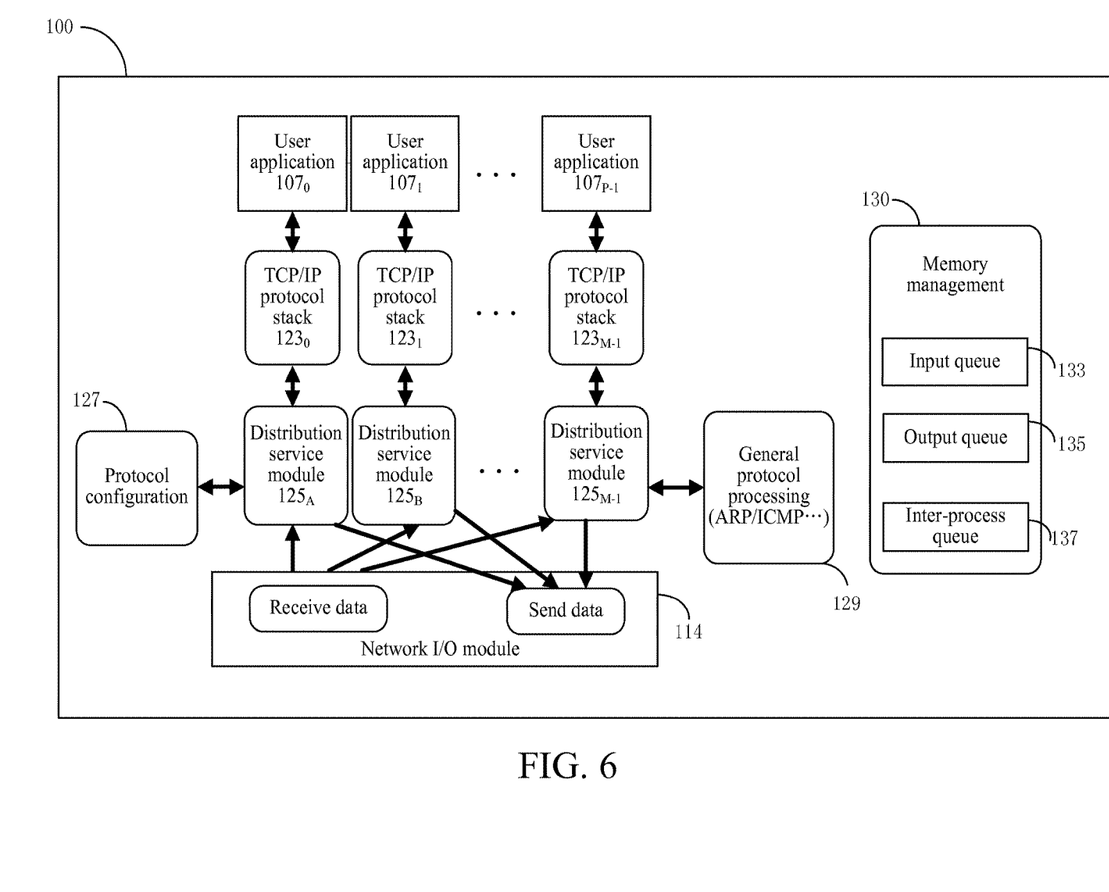
FIG. 6 is a diagram of a data processing apparatus according to still another embodiment of the present disclosure.

FIG. 6 is a structural diagram of another data processing apparatus 100 according to an embodiment of the present disclosure. A difference from the embodiment shown in FIG. 5 lies in that the user space 120 includes M distribution service modules $125_A$-$125_{M-1}$, where each distribution service module is corresponding to one protocol stack 123.

In a possible implementation manner, each distribution service module 125 is corresponding to one network interface 105, and is responsible for data receiving and transmitting of the network interface 105 only.

In another implementation manner, if a network interface 105 has an RSS function, that is, the network interface 105 having the RSS function may distribute, according to header content of data packets, the data packets received from the network interface 105 to different hardware queues. In this case, one distribution service module 125 may correspond to one or more hardware queues on one or more interface cards, receive data packets from these hardware queues, and distribute the data packets. A process of sending a data packet is similar. FIG. 6 shows a schematic diagram of a configuration manner of multiple distribution service modules 125 used in cooperation with the RSS function of the network interface 105.

In a case in which multiple distribution service modules 125 are configured in a system, the distribution service modules 125 capture data packets from one or more queues. The distribution service modules capture, in a polling mode, data packets from multiple receiving queues of multiple network interfaces by using a network input/output module 114, and store the captured data packets in memory space of a memory management module 130. The distribution service modules send, according to headers or values of other parts of the captured data packets, pointers to the data packets to an input queue 133 corresponding to a specific protocol stack.

The distribution service modules 125 identify specific general protocols data packets such as the ARP data packets and ICMP data packets, and send these data packets to a general protocol processing module 129 for processing. Certainly, according to different configuration, protocols data packets such as the ARP data packets may also be processed in a protocol stack module 123.

According to the foregoing embodiment, M protocol stacks independently perform, according to a preconfigured rule, protocol processing on data packets to be processed, where the M protocol stacks are disposed in user space 120 of an operating system and separately run on different logic cores of a processor, and the data packets to be processed are packets received by distribution service modules 125 that are in a one-to-one correspondence with the M protocol stacks 123. This can improve protocol processing efficiency. The protocol stacks 123 are applied in the user space 120, which may facilitate development of applications by developers. In addition, in this embodiment of the present disclosure, almost all data processing processes are performed in user mode, data in kernel space 110 is transparently transmitted to user space 120 simply by memory mapping, thereby reducing resource consumption.

Figure 7:
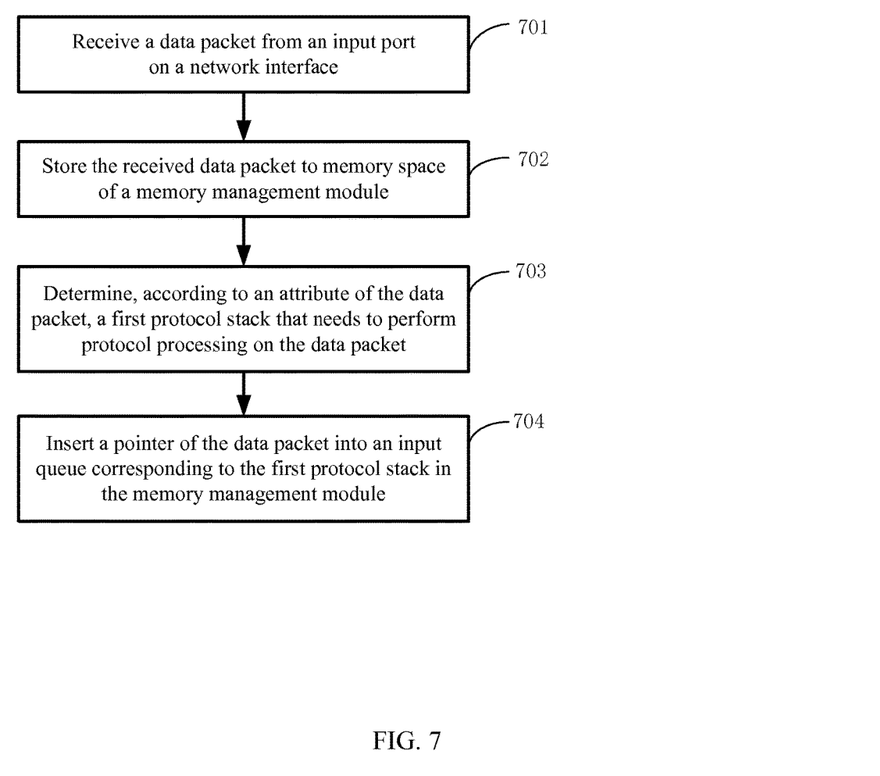
FIG. 7 is a flowchart of a data processing method according to an embodiment of the present disclosure.

Correspondingly, as shown in FIG. 7, an embodiment of the present disclosure further provides a data processing method, which is applied to user space 120 of an operating system 103, and the method includes:

701. Receive a data packet from an input port on a network interface;

A distribution service module 125 captures, in a polling mode, a data packet from a hardware input port on the network interface 105, where each distribution service module independently captures a data packet in parallel.

702. Store the received data packet to memory space of a memory management module 130;

The memory space is memory space after memory mapping, and the memory space is accessible in both user mode and kernel mode. A network input/output module 114 stores, in a memory mapping manner, the received data packet to the memory space of the memory management module 130, where each data packet has a different address.

703. Determine, according to an attribute of the data packet, a first protocol stack 123 that needs to perform protocol processing on the data packet;

If there is only one distribution service module 125, the distribution service module 125 needs to read a header of each received data packet, and determines, according to an attribute carried in the header, a protocol stack 123 that needs to processes the data packet. The first protocol stack 123 is one of M protocol stacks 123. The M protocol stacks 123 and the distribution service module 125 are disposed in the user space 120 of the operating system 103, and M is a positive integer greater than 1.

If there are multiple distribution service modules 125 in a system, and each distribution service module is corresponding to one network interface 105, a distribution service module 125 reads only a data packet received from an input port on a network interface 105 corresponding to the distribution service module 125, and determines, according to information in a header of the data packet, a protocol stack 123 that needs to processes the data packet.

704. Insert a pointer to the data packet into an input queue corresponding to the first protocol stack 123, where the pointer of the data packet points to an address of the data packet in the memory space, so that the first protocol stack 123 retrieves, according to the pointer in the input queue, the data packet corresponding to the pointer from the memory space, and performs protocol processing on the data packet according to a protocol processing rule.

After the distribution service module 125 determines the protocol stack 123 that needs to perform protocol processing on the received data packet, the distribution service module 125 inserts the pointer that points to the address of the data packet in the memory space into the input queue corresponding to the protocol stack 123.

The first protocol stack retrieves, according to the pointer in the input queue, the data packet corresponding to the pointer from the memory space, and performs protocol processing on the data packet according to the protocol processing rule.

Each protocol stack 123 retrieves a pointer only in an input queue corresponding to the protocol stack 123, obtains, according to the pointer, a data packet from the memory space, and performs protocol processing.

After the first protocol stack 123 performs protocol processing on the data packet, if the data packet after the protocol processing needs to be processed by a user application program 107, the first protocol stack 123 copies the data packet after the protocol processing to the user application program 107.

If the data packet after the protocol processing does not need to be processed by an application program 107, according to a type of a data packet, a data packet that needs to be stored is retained in the memory space, and a data packet that does not need to be stored is discarded by the protocol stack 123.

If the data packet after the protocol processing needs to be sent outwards, the protocol stack 123 inserts the pointer to the data packet into an output queue 135 of the memory management module 130, so that the distribution service module 123 sends, according to the pointer in the output queue, the data packet corresponding to the pointer from a network interface 105 corresponding to the output queue 135.

According to the foregoing embodiment, M protocol stacks 123 independently perform, according to a preconfigured rule, protocol processing on data packets to be processed, where the M protocol stacks 123 are disposed in user space 120 of an operating system 103 and separately run on different logic cores of a processor, and the data packets to be processed are packets received by at least one distribution service module 125. This can improve protocol processing efficiency.

Figure 8:
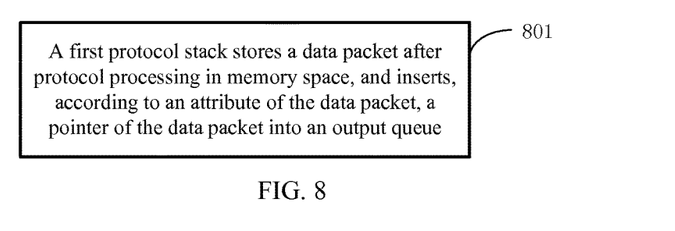
FIG. 8 is a flowchart of a data processing method according to another embodiment of the present disclosure.

Correspondingly, as shown in FIG. 8, an embodiment of the present disclosure further provides a data processing method, where the method includes:

801. A first protocol stack 123 stores a data packet after protocol processing in memory space, and inserts, according to an attribute of the data packet, a pointer to the data packet into an output queue 135 so that a distribution service module 125 reads the pointer from the output queue, and sends the data packet corresponding to the pointer outwards through an output port on a network interface 105 corresponding to the output queue 135.

The first protocol stack 123 is one of M protocol stacks 123 located in user space 120. Each of the M protocol stacks 123 separately runs on a logic core of a processor. The M protocol stacks 123 and the distribution service module 125 are disposed in the user space 120 of an operating system 103. The output queue 135 is corresponding to the output port on the network interface 105, and the pointer to the data packet points to an address of the data packet in the memory space, where the memory space is memory space after memory mapping. The memory space is accessible in both user mode and kernel mode, and M is a positive integer greater than 1.

If the data packet processed by the protocol stack 123 does not need to be processed by a user application 107, the data packet is directly stored in the memory space. If the data packet needs to be sent outwards, the first protocol stack 123 further needs to insert, according to an attribute such as a destination address of the data packet, the pointer to the data packet to the output queue 135 corresponding to the corresponding output port.

The distribution service module 125 reads the data packet from the memory space according to the pointer of the data packet. If there are multiple distribution service modules 125 in a system, and there is a configured correspondence relationship between each distribution service module 125 and an output port on the network interface 105, each distribution service module 125 only needs to read a data packet corresponding to a pointer in an output queue corresponding to the distribution service module 125.

The distribution service module 125 outwardly sends, by using the output port on the network interface 105, the data packet corresponding to the pointer; after determining the output port that is on the network interface 105 and is used to output the data packet, the distribution service module 125 sends, by using a network input/output module 114, the data packet corresponding to the pointer in the memory space to the output port on the network interface 105, where the output port is corresponding to the output queue 135.

According to the foregoing embodiment, M protocol stacks 123 independently perform, according to a preconfigured rule, protocol processing on data packets to be processed, where the M protocol stacks 123 are disposed in user space 120 of an operating system 103 and separately run on different logic cores of a processor. The data packets to be processed are packets received by at least one distribution service module 125. This can improve protocol processing efficiency. In addition, when a data packet needs to be sent, functional entities in user mode only need to exchange a pointer that points to the data packet, and do not need to copy the data packet, thereby reducing resource consumption.

Figure 9:
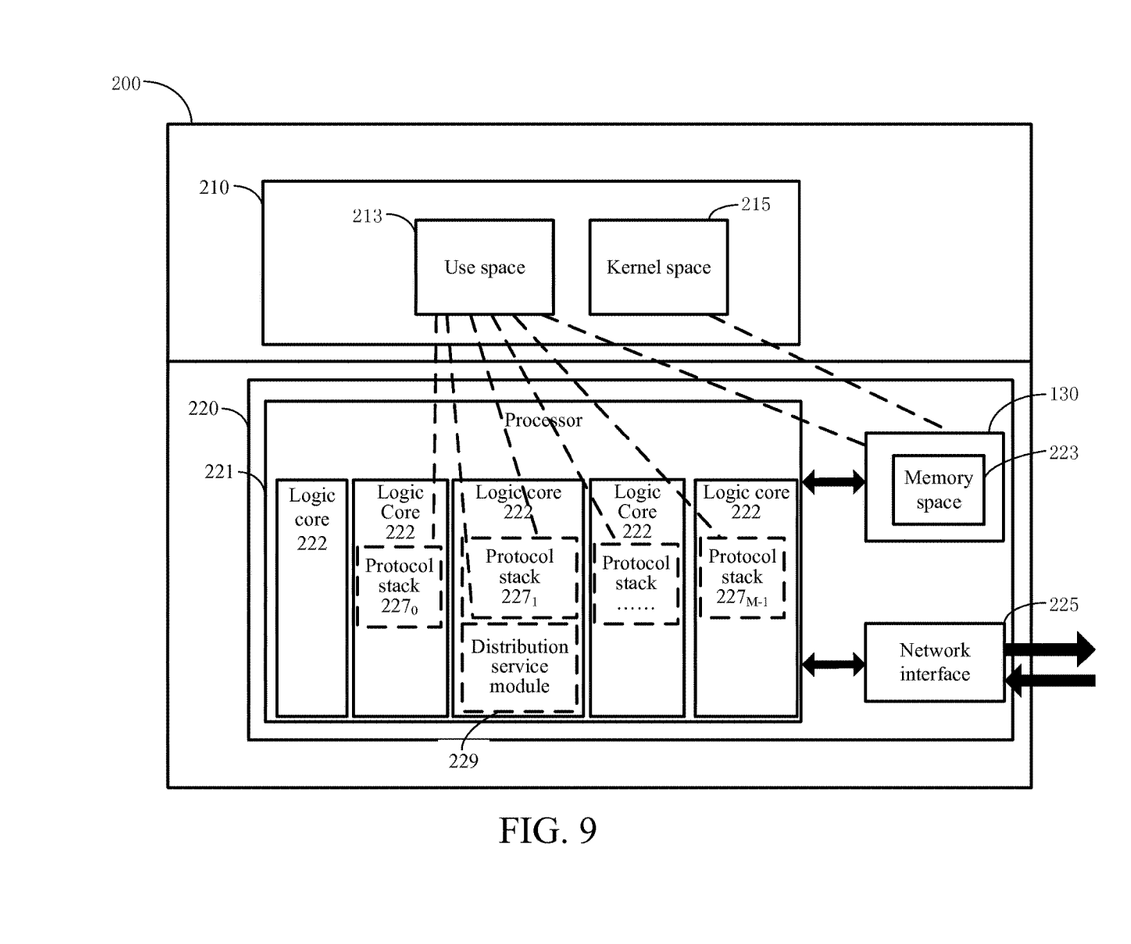
FIG. 9 is a diagram of a computer according to an embodiment of the present disclosure.

Accordingly, as shown in FIG. 9, an embodiment of the present disclosure further provides a computer 200. The computer 200 includes a hardware layer 220 and an operating system layer 210 running above the hardware layer 220. The hardware layer 220 includes at least one network interface 225 and at least one processor 221. The processor 221 includes at least M logic cores 222, M is a positive integer greater than 1. The operating system layer 210 is divided into kernel space 215 and user space 213. M protocol stacks $227_0$-$227_{M-1}$ and a distribution service module 229 are disposed in the user space 213. The M protocol stacks 227 separately run on the M logic cores 222 of the processor 221. Each of the M protocol stacks 227 is used to independently perform, according to a protocol processing rule, protocol processing on a data packet to be processed. The distribution service module 229 is configured to receive, according to a preconfigured rule, an input data packet from at least one input port on the at least one network interface 225 and store the data packet to memory space. One protocol stack 227 of the M protocol stacks 227 performs protocol processing on the data packet. The distribution service module 229 receives data packets processed by the M protocol stacks 227 and send the data packets outwards through an output port on the network interface 225, where the memory space is memory space after memory mapping, and the memory space is accessible in both user mode and kernel mode.

In an optional embodiment, a memory management module 130 is further disposed in the user space 213, where the memory management module 130 includes the memory space 223 used to store a data packet, M input queues corresponding to the M protocol stacks 227, and an output queue corresponding to the output port on the network interface. The M input queues are used to store pointers of data packets that need to be processed by the M protocol stacks 227. The output queue is used to store a pointer of a data packet that needs to be sent outwards. The pointers point to addresses of the data packets in the memory space, the memory space is memory space after memory mapping, and the memory space is accessible in both user mode and kernel mode.

The distribution service module 229 is configured to store the data packet received from the input port on the network interface 225 in the memory space, read a header of the data packet, determine, according to the header, the protocol stack 227 that needs to perform protocol processing on the data packet, and insert a pointer to the data packet into the input queue corresponding to the protocol stack 227. The protocol stack 227 is used to read the data packet from the memory space according to the pointer in the input queue corresponding to the protocol stack, and perform protocol processing on the data packet. If the data packet after the protocol processing needs to be submitted to a user application, the protocol stack 227 copies the data packet to the user application. If the data packet after the protocol processing needs to be sent outwards, insert, by the protocol stack 227, the pointer to the data packet into the output queue of the memory management module 130. The distribution service module 229 is configured to send, according to the pointer in the output queue, the data packet corresponding to the pointer through the output port on the network interface 225 corresponding to the output queue.

In an optional embodiment, a quantity of distribution service modules 229 is M, the M distribution service modules 220 separately correspond to the M protocol stacks 227. The M distribution service modules 227 separately run on the M logic cores 222 of the processor 220.

It should be noted that, the embodiments of the present disclosure are described in a progressive manner; for same or similar parts in the embodiments, reference may be made to these embodiments.

By using the computer provided in the foregoing embodiment, a function of parallel protocol processing by multiple processes in user space of an operating system is implemented in a multi-core environment by using a parallel processing feature of a multi-core system, thereby reducing resource consumption caused by data packet copying.

A person skilled in the art may be further aware that, in combination with the examples described in the embodiments disclosed in this specification, units and algorithm steps may be implemented by electronic hardware, computer software, or a combination thereof To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may be configured in a random access memory (RAM), memory, a read-only memory (ROM), an electrically programmable ROM, an electrically erasable programmable ROM, a register, a hard disk, a removable disk, a CD-ROM, or a storage medium in any other forms well-known in the art.

In the foregoing specific implementation manners, the objective, technical solutions, and benefits of the present disclosure are further described in detail. It should be understood that the foregoing descriptions are merely specific implementation manners of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A data processing method, wherein the method comprises:
   storing, by a first protocol stack, a data packet in memory space after protocol processing, and inserting, according to an attribute of the data packet, a pointer to the data packet into an output queue, so that a distribution service module of M distribution service modules reads the pointer from the output queue, and sends the data packet corresponding to the pointer through a network input/output module to an output port on a network interface corresponding to the output queue, wherein M is a positive integer greater than 1, and M is a quantity of the distribution service modules, wherein:
   the first protocol stack is one of M protocol stacks located in user space, wherein M is a quantity of the protocol stacks, each protocol stack of the M protocol stacks separately runs on a logic core of a common processor, the M protocol stacks and the M distribution service modules are disposed in the user space of an operating system; and the pointer of the data packet points to an address of the data packet in the memory space, wherein the memory space is memory space after memory mapping, the memory space is accessible in both user mode and kernel mode;
   each of the M distribution service modules is separately corresponding to one of the M protocol stacks, and each of the M distribution service modules separately runs on one of the M logic cores of the common processor, wherein M is a quantity of the logic cores.

2. The data processing method according to claim 1, wherein the sends the data packet that is corresponding to the pointer through a network input/output module to an output port on a network interface corresponding to the output queue comprises:
   sending, using the network input/output module, the data packet corresponding to the pointer and in the memory space to the output port on the network interface corresponding to the output queue, wherein the network input/output module is disposed in kernel space of the operating system.

3. A computer, the computer comprising a hardware layer and a layer of an operating system running above the hardware layer, wherein the hardware layer comprises at least one network interface and a common processor, the common processor comprises at least M logic cores, M is a positive integer greater than 1, and M is a quantity of the logic cores, the operating system is divided into kernel space and user space, and M protocol stacks and M distribution service modules are disposed in the user space, wherein M is a quantity of the protocol stacks, and M is a quantity of the distribution service modules, wherein:

each of the M protocol stacks separately runs on one of the M logic cores of the common processor, and each protocol stack of the M protocol stacks is used to independently perform, according to a protocol processing rule, protocol processing on a data packet to be processed; and each of the M distribution service modules is configured to: receive, a data packet from at least one input port on the at least one network interface and store the data packet to memory space, so that one protocol stack of the M protocol stacks performs protocol processing on the data packet, receive data packets processed by the M protocol stacks, and send the data packets outwards through an output port on the network interface, wherein the memory space is memory space after memory mapping, and the memory space is accessible in both user mode and kernel mode;

each of the M distribution service modules is separately corresponding to one of the M protocol stacks, and each of the M distribution service modules separately runs on one of the M logic cores of the common processor.

4. The computer according to claim 3, wherein a memory management module is further disposed in the user space, wherein:

the memory management module comprises the memory space used to store a data packet, M input queues corresponding to the M protocol stacks, and an output queue corresponding to the output port on the network interface, wherein the M input queues are used to store pointers to data packets that need to be processed by the M protocol stacks, the output queue is used to store a pointer to a data packet that needs to be sent outwards, and the pointers point to addresses of the data packets in the memory space;

each of the M distribution services module is configured to: store the data packet received from the input port on the network interface in the memory space, read a header of the data packet, determine, according to the header, the protocol stack that needs to perform protocol processing on the data packet, and insert a pointer to the data packet into the input queue corresponding to the protocol stack;

wherein the protocol stack is used to:

read the data packet from the memory space according to the pointer in the input queue corresponding to the protocol stack, and perform protocol processing on the data packet;

if the data packet after the protocol processing needs to be submitted to a user application, copy the data packet to the user application;

if the data packet after the protocol processing needs to be sent outwards, insert, by the protocol stack, the pointer into the output queue of the memory management module; and the distribution service module is configured to send, according to the pointer in the output queue, the data packet through the output port on the network interface corresponding to the output queue.

5. The computer according to claim 3, further comprising:
a protocol configuration module, configured to set the protocol processing rule for the protocol stack.

6. The computer according to claim 4, further comprising:
a general protocol processing module, configured to perform general protocol processing on a data packet on which general protocol processing needs to be performed; and each of the M distribution service modules is further configured to: when it is determined, according to the header of the received data packet, that general protocol processing needs to be performed on the data packet, send the pointer of the data packet to the general protocol processing module, so that the general protocol processing module performs general protocol processing on the data packet corresponding to the pointer.

7. The computer according to claim 3, further comprising a network input/output module disposed in kernel space of the operating system, wherein:

each of the M distribution service modules is configured to: receive the data packet by using the network input/output module from the input port on the network interface, and send the data packet outwards by using the network input/output module from the output port on the network interface.

8. A computer, the computer comprising a hardware layer and a layer of an operating system running above the hardware layer, wherein the hardware layer comprises at least one network interface and a common processor, the common processor comprises at least M logic cores, wherein M is a positive integer greater than 1, and M is a quantity of the logic cores, the operating system is divided into kernel space and user space, and M protocol stacks and a distribution service module are disposed in the user space, wherein M is a quantity of the M protocol stacks, the computer further comprising a network input/output module disposed in the kernel space of the operating system, wherein:

each of the M protocol stacks separately runs on one of the M logic cores of the common processor, and each protocol stack of the M protocol stacks is used to independently perform, according to a protocol processing rule, protocol processing on a data packet to be processed; and the distribution service module is configured to: receive, a data packet in a polling mode by using the network input/output module from at least one input port on the at least one network interface and store the data packet to memory space, so that one protocol stack of the M protocol stacks performs protocol processing on the data packet, receive data packets processed by the M protocol stacks, and send the data packets outwards by using the network input/output module from the output port on the network interface, wherein the memory space is memory space after memory mapping, and the memory space is accessible in both user mode and kernel mode.

* * * * *